(12) United States Patent
Ceekala et al.

(10) Patent No.: US 8,923,166 B2
(45) Date of Patent: Dec. 30, 2014

(54) DATA SIGNAL TRANSCEIVER CIRCUITRY FOR PROVIDING SIMULTANEOUS BI-DIRECTIONAL COMMUNICATION VIA A COMMON CONDUCTOR PAIR

(75) Inventors: Vijaya G. Ceekala, San Jose, CA (US); Qingping Zheng, Saratoga, CA (US); Min Du, Campbell, CA (US); Xin Liu, Mountain View, CA (US); Chandrakumar R. Pathi, San Jose, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 280 days.

(21) Appl. No.: 13/045,301

(22) Filed: Mar. 10, 2011

(65) Prior Publication Data
US 2012/0002573 A1 Jan. 5, 2012

Related U.S. Application Data

(60) Provisional application No. 61/312,419, filed on Mar. 10, 2010.

(51) Int. Cl.
*H04B 1/56* (2006.01)
*H04L 25/49* (2006.01)
*H04L 5/14* (2006.01)
*H04L 25/02* (2006.01)

(52) U.S. Cl.
CPC ......... *H04L 25/4904* (2013.01); *H04L 25/0298* (2013.01); *H04L 25/0284* (2013.01); *H04L 5/1461* (2013.01); *H04L 25/0296* (2013.01); *H04L 25/0276* (2013.01)
USPC .......................................... 370/276; 370/286

(58) Field of Classification Search
USPC ............. 370/276, 463, 480, 280; 398/58, 71; 455/551
See application file for complete search history.

(56) References Cited

U.S. PATENT DOCUMENTS

| 2004/0248613 | A1* | 12/2004 | Gorcea et al. | 455/551 |
| 2006/0092967 | A1* | 5/2006 | Bergeron et al. | 370/463 |
| 2009/0202241 | A1* | 8/2009 | Yu et al. | 398/58 |

OTHER PUBLICATIONS

Written Opinion corresponding to PCT application No. PCT/US2011/027965 mailed Nov. 16, 2011, 5 pages.
International Search Report corresponding to PCT/US2011/027965 mailed Nov. 16, 2011, 3 pages.

* cited by examiner

Primary Examiner — Andrew Lai
Assistant Examiner — Jamaal Henson
(74) Attorney, Agent, or Firm — Andrew Viger; Frederick J. Telecky, Jr.

(57) ABSTRACT

Interface circuitry and method for transmitting and receiving downstream and upstream data signals simultaneously via a common conductor pair. The composite signal containing the downstream and upstream data signal components being conveyed by the common conductor pair is isolated, e.g., via signal filtering or buffering, and combined with an appropriately scaled inverse replica of the outgoing upstream data signal to subtract out upstream data signal components and thereby provide the downstream data signal substantially free of any upstream data signal components.

15 Claims, 5 Drawing Sheets

DATA SIGNAL TRANSCEIVER CIRCUITRY FOR PROVIDING SIMULTANEOUS BI-DIRECTIONAL COMMUNICATION VIA A COMMON CONDUCTOR PAIR

RELATED APPLICATION DATA

This application is a non-provisional based on and claiming priority from U.S. Provisional Application No. 61/312,419, filed Mar. 10, 2010.

BACKGROUND

High speed audio/video communication systems involve point-point links for high-speed data transfer from a data source such as a camera or a video player and a display. These systems require dedicated point-point links to transfer video data while requiring one or more separate physical links to transfer control information back to the source. The configuration data is usually sent to provide control information for the cameras like zoom, tilt, etc.

One area in which such systems are seeing increasing use is that of automotive media communications for the front seat or dashboard (such as rear/side cameras) and rear seat (such as a DVD player). What is needed is both display data in one direction, and bi-directional control (e.g., camera tilt/zoom and DVD control player). One conventional communication link uses five wire pairs (three for data, one for a clock and one for control). Another conventional communication link uses two wire pairs (one for data with an embedded clock and one for control).

An exemplary application is a communication link between a rear view camera and dashboard display. The camera communicates rear view video data to the dashboard display over the forward channel. Control commands, e.g., pan, tilt or zoom, are communicated back to the camera over the back channel by being modulated onto the forward channel. The camera responds with an acknowledgement signal (ACK) via the forward channel control frame.

In the context of automotive infotainment system, a control channel is primarily used in two cases: safety and driver assist systems, and rear seat entertainment systems.

In safety and driver assist systems, a forward channel carries data from a camera to a head unit for further image processing. A control channel carries management data back from the head unit to camera. Typical control commands include commands to control the camera, e.g., pan, tilt, zoom, etc. A conventional system like this uses two pairs of wires, one for carrying high-speed forward channel data and the other to carry control information.

In rear seat entertainment systems, the forward channel carries high-speed data such as high definition (HD) video from a DVD or Blu-Ray player. The control channel is used to exchange keys for content protection and display aspect ratio information with the video source for automatic video formatting.

Typical figures of merit for evaluating the efficiency of a control channel are latency, electromagnetic interference (EMI) and number of cables and connectors. Regarding latency, in driver assist applications where detecting any obstructions on the road in the front or to the rear of a car or when developing lane-departure warning systems, control channel latency is a very important factor as an evasive action is required to be taken in time to prevent any accidents or injuries. Regarding EMI, automotive systems have stringent emissions specifications. High full-swing TTL/CMOS levels that go around wires inside an automobile can create strong EMI issues that can interfere with other electronic systems that control engine operation. Regarding the number of cables and connectors, a large number of cables and connectors add weight and costs.

Three types a control channel architectures have been used: separate wires, blanking transmission and common-mode modulation. Regarding separate wires, control channel information is transferred via a separate wire or cable. While this offers very good latency, digital switching transients add to EMI and the need for extra cable and connectors adds weight and costs.

Referring to FIG. 1, a conventional embodiment of such a bi-directional communication link 10 includes a forward channel driver 12, a back channel receiver 14, a forward channel receiver 32 and a back channel driver 34, all interconnected substantially as shown. In accordance with well known techniques, the differential forward channel signal 11$f$ is amplified by the forward channel driver 12 to provide the differential forward channel signal 13 across a termination resistance 16 for coupling via coupling capacitors 20$p$, 20$n$ to the differential signal line 30. At the other end, the signal is further coupled via coupling capacitances 40$p$, 40$n$ to a termination resistance 36, following which the forward channel signal is amplified by the forward channel receiver 32 to provide the forward channel data signal 33 for downstream processing (not shown).

In the other direction, the back channel driver 34 receives the differential back channel signal 11$b$, and amplifies it to provide the back channel transmission signal across its termination resistance 38 for coupling to the differential signal line 30 by the coupling capacitors 40$p$, 40$n$. The back channel signal, coupled by the upstream coupling capacitors 20$p$, 20$n$, is received across a termination resistance 18 and amplified by the back channel receiver 14 to provide the back channel data signal 15.

As noted above, one technique relies on so-called "blanking transmission", in which the back channel data is modulated into blanking intervals, e.g., vertical or horizontal blanking intervals of forward channel video data. For example, as depicted here, the back channel data pulses are inserted within the vertical blanking interval Tb as a time-domain multiplexed data signal. While this can be a reasonable solution to operate with a single cable, e.g., a common conductor pair, overall signal latency is increased, since blanking intervals are only available once every video frame. Depending upon the type of data being transmitted or the application, this can be a relatively long time interval and make a significant difference, e.g., in an accident scenario where detection and response time in microseconds are required.

Referring to FIG. 2, another technique relies upon common-mode modulation, where back channel data, e.g., control information, is conveyed via the same conductor pair using common-mode modulation. Since the forward channel data is transmitted differentially, common-mode modulation in the reverse direction will, ideally, not interfere with the forward channel data transmission. The back channel data pulses 35 are modulated at a common mode potential on both conductors of the conductor pair 30. While this is advantageous in terms of signal latency and costs (i.e., in terms of requiring fewer conductors), such technique has increased EMI due to common-mode signal spikes. This can result in otherwise problematic restrictions on the design of the forward channel receiver 32, particularly in terms of its common-mode signal rejection.

Accordingly, it would be beneficial to have a technique for providing simultaneous bi-directional communication via a common conductor pair while minimizing signal latency, EMI and the number of conductors required.

DETAILED DESCRIPTION

Figure 1:
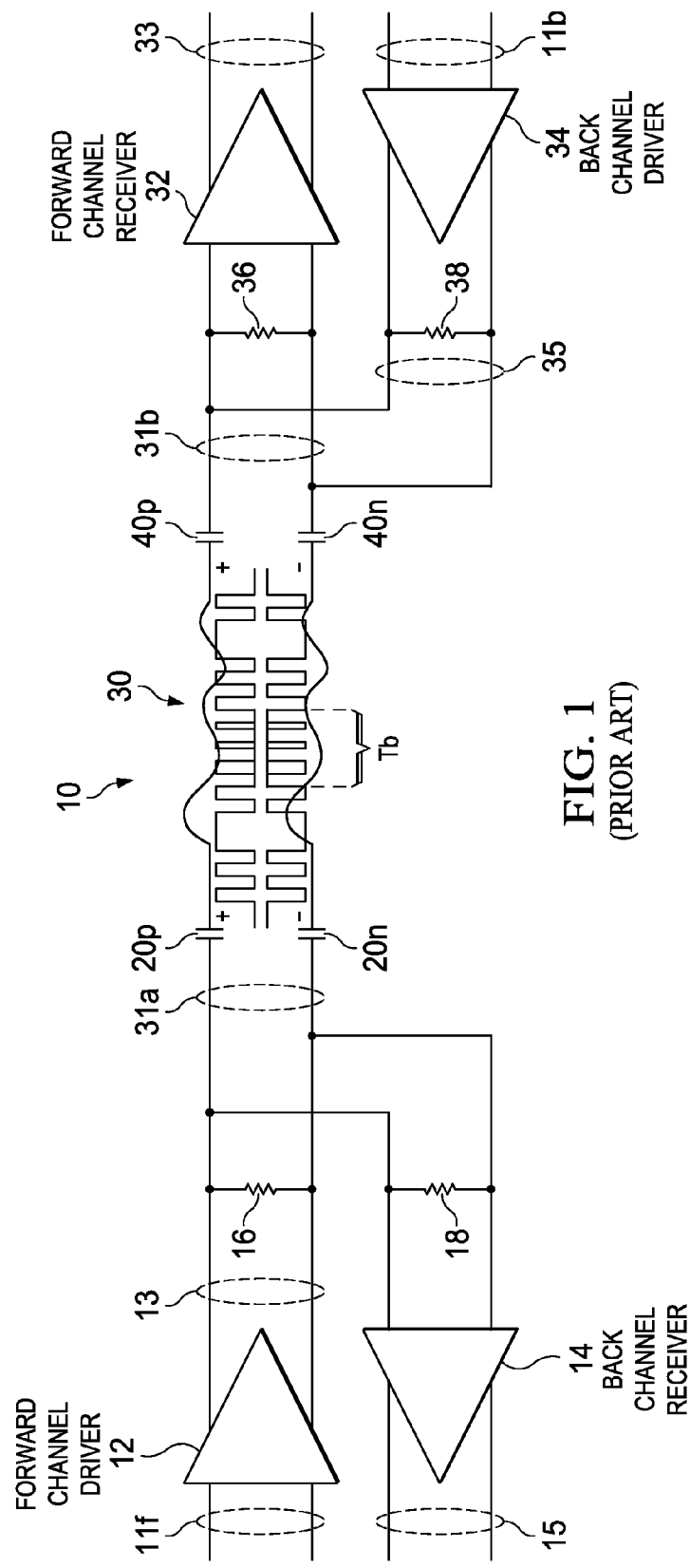
FIG. 1 is a functional block diagram of a conventional system providing bi-directional communication via a common conductor pair using blanking transmission.

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed. Moreover, to the extent that the figures illustrate diagrams of the functional blocks of various embodiments, the functional blocks are not necessarily indicative of the division between hardware circuitry. Thus, for example, one or more of the functional blocks may be implemented in a single piece of hardware As an overview, in accordance with exemplary embodiments of the presently claimed invention, a system and method are provided for simultaneous bi-directional data transfer in which one physical link can be used to transfer high-speed audio/video data as well as two virtual channels that allow transfer of configuration and other control information simultaneously. This saves the need for extra cable pairs and consequently reduces overall system cost. Additionally, this reduces the overall weight of the hardware used to connect the infotainment system and improves the fuel economy in a weight-sensitive system like automotive vehicles.

The basic simultaneous bi-directional communication link in accordance with exemplary embodiments of the presently claimed invention uses a single physical media channel (e.g., a twisted wire pair) that carries both data and bi-directional control signals, e.g., high speed (gigabit-per-second) forward channel for data and control (from source to head end), and lower speed (megabit-per-second) back channel for control (from head end to source). The forward channel is segregated into sequential data and forward control frames, while, according to an aspect of the invention, the back channel carries back control modulated onto the forward channel using a coding scheme, preferably with no DC component (e.g., Manchester code). To ensure that there is no baseline wander due to the presence of AC coupling capacitors, the back channel data is encoded using a coding scheme with no DC component, such as Manchester code, and the forward channel data is encoded using DC-balanced coding, such as 8$b$/10$b$ encoding, of which both types, as well as others, are well known in the art.

Figure 2:
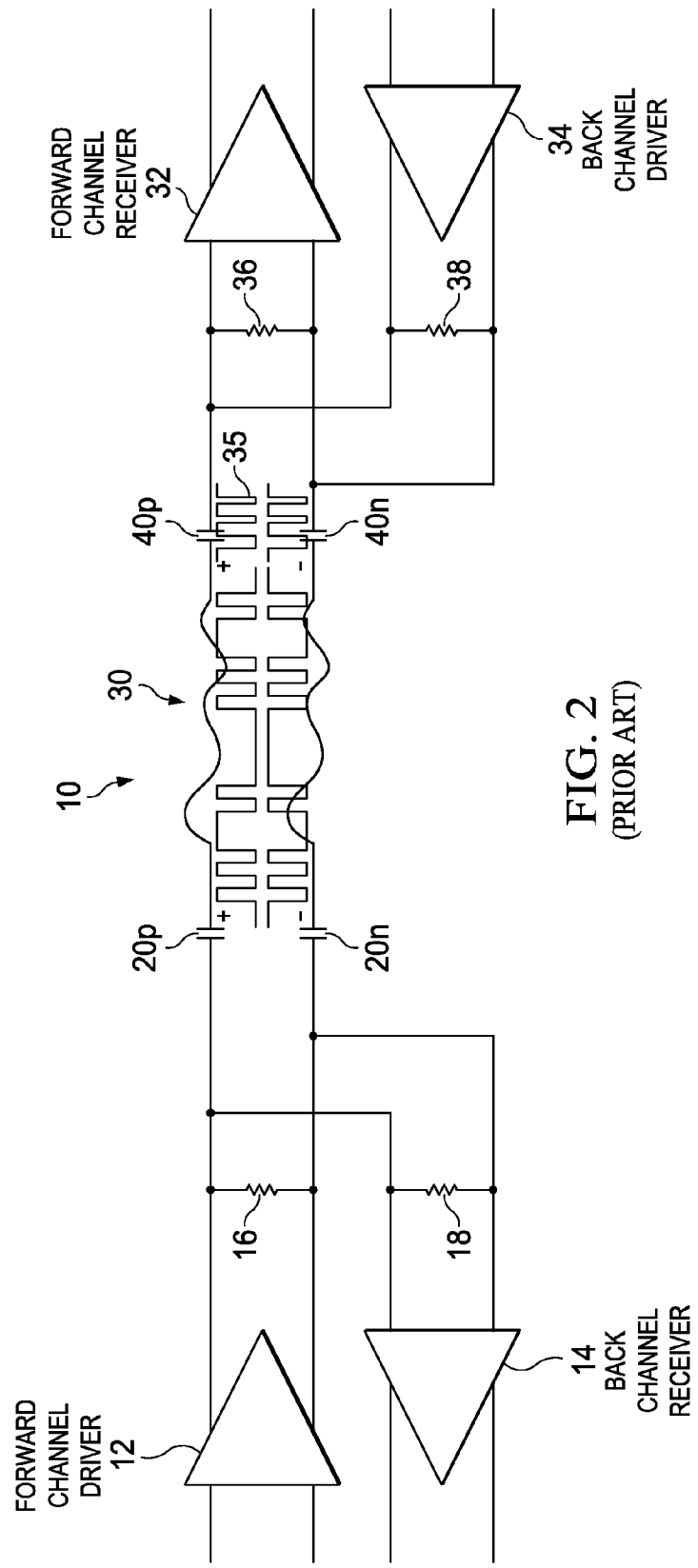
FIG. 2 is a functional block diagram of a conventional system providing bi-directional communication via a common conductor pair using common-mode modulation.
Figure 3:
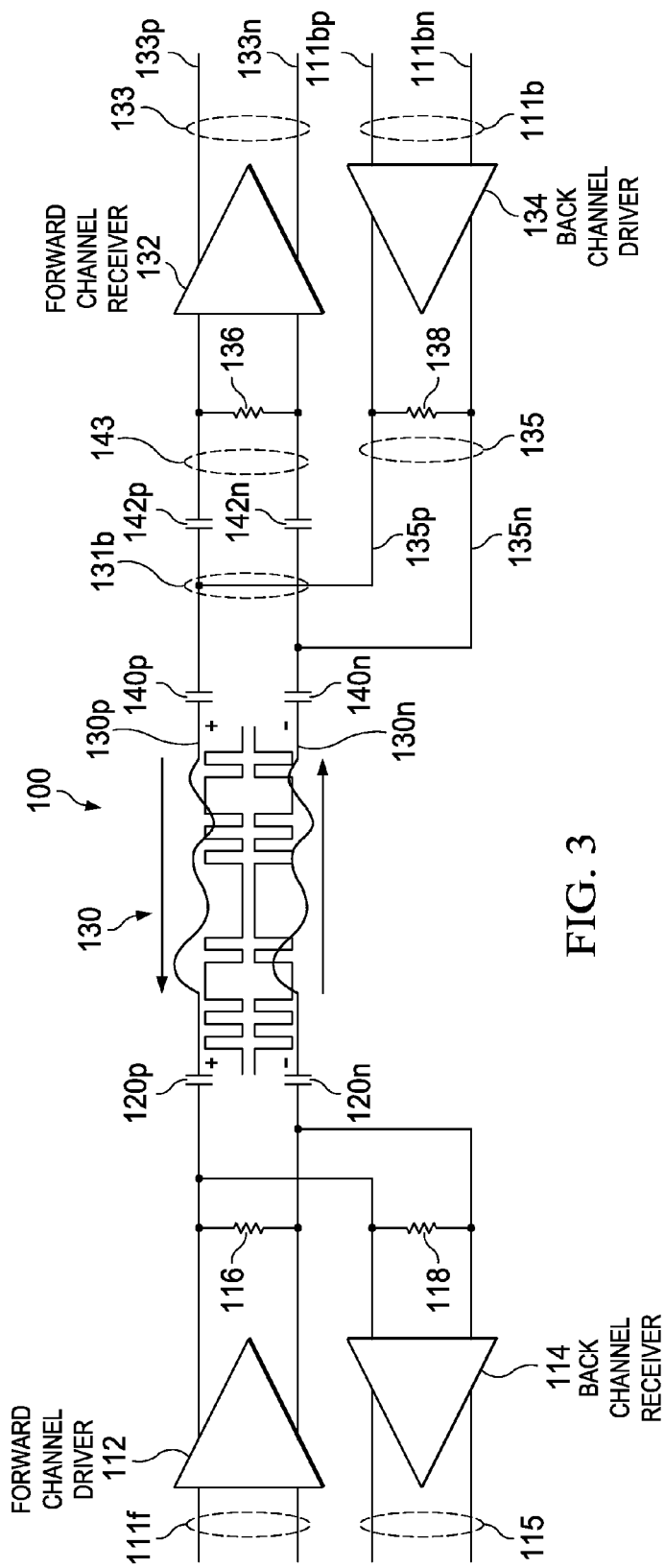
FIG. 3 is a functional block diagram of a system using data signal transceiver circuitry for providing simultaneous bi-directional communication via a common conductor pair in accordance with one embodiment of the presently claimed invention.

Referring to FIG. 3, a communication system 100 using data signal transceiver circuitry in accordance with one embodiment of the presently claimed invention includes a forward channel driver 112, back channel receiver 114, forward channel receiver 132 and back channel driver 134, all interconnected substantially as shown, similar to the circuits of FIGS. 1 and 2 (hence, the use of related numerical element identifiers). However, as discussed in more detail below, in addition to the upstream and downstream coupling capacitors 120$p$, 120$n$, 140$p$, 140$n$, additional coupling capacitors 142$p$, 142$n$, are used in series with the downstream coupling capacitors 140$p$, 140$n$ to provide high pass frequency filtering of the signal components being coupled from and to the cable 130 and forming the composite signal 131$b$.

The forward channel signal, as provided by the forward channel driver 112, is at a higher frequency (e.g., gigabits per second) than the back channel data signal (e.g., megabits per second), as provided by the back channel driver 134. Accordingly, the high pass filtering provided by the additional coupling capacitors 142$p$, 142$n$ beneficially assists in the removal of the back channel signal components 135 being transmitted via the cable 130 simultaneously during reception of the forward channel data signal components originating from the forward channel driver 112. As a result, the filtered forward channel data signal 143 includes reduced levels of back channel data signal components 135, which appear in the composite data signal 131$b$.

Figure 4:
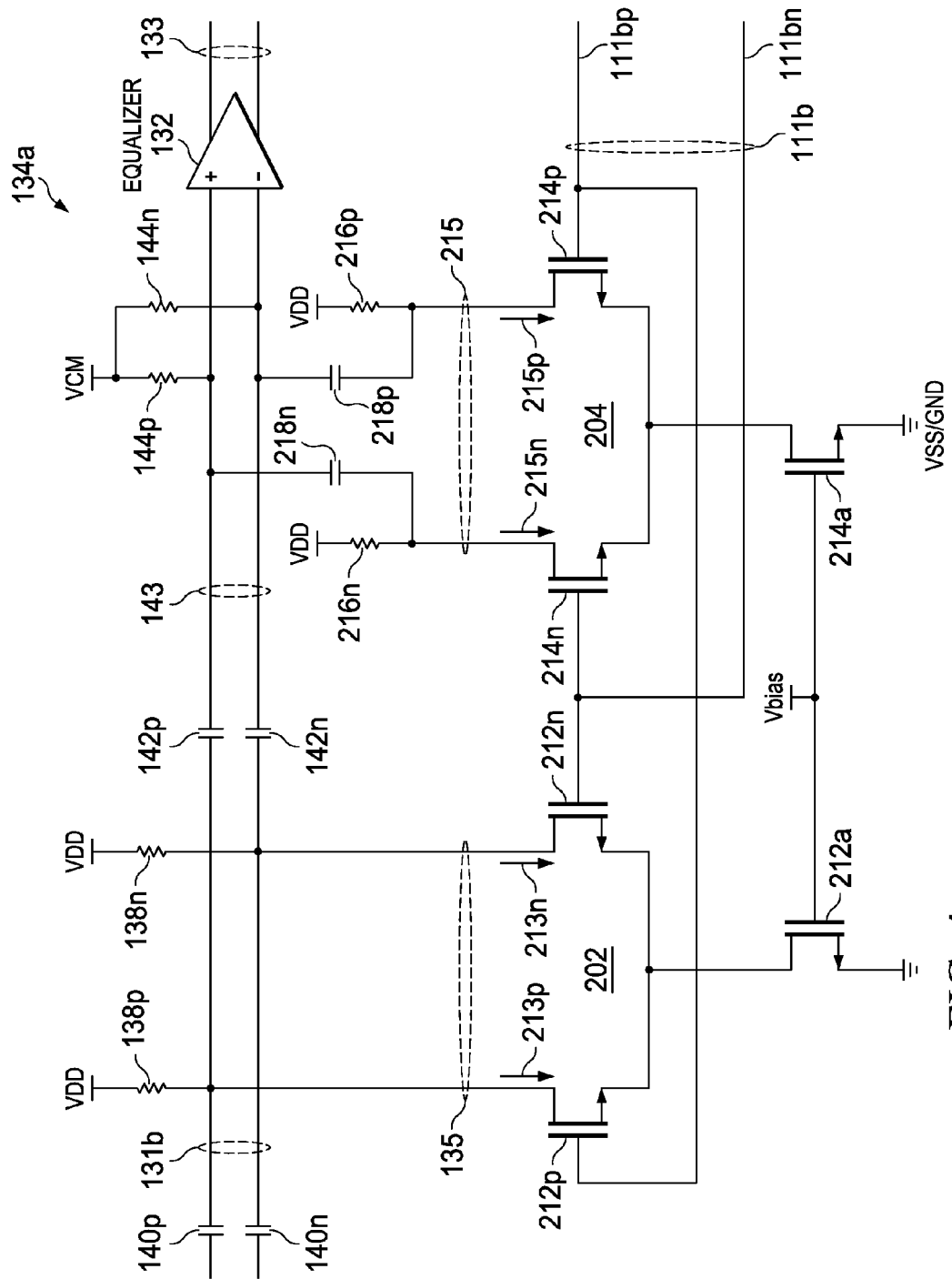
FIG. 4 is a schematic diagram of back channel driver circuitry for use in the circuit of FIG. 3.

Referring to FIG. 4, back channel driver circuitry 134$a$ in accordance with one embodiment of the presently claimed invention includes main driver circuitry 202 and replica driver circuitry 204. As discussed above, signal coupling to and from the cable 130 is provided by coupling capacitors 140$p$, 140$n$. The back channel driver circuitry 202 includes opposing transistors 212$p$, 212$n$ forming a differential amplifier biased by a tail current source transistor 212$a$, the gate electrode of which is biased by a bias voltage Vbias. (In accordance with preferred embodiments, the transistor type used is an insulated gate field effect transistor, often referred to by the acronym MOSFET for metal oxide semiconductor field effect transistor.) The gate electrodes of the amplifier transistors 212$p$, 212$n$ are driven by the positive 111$b$ and negative 111$bn$ phases of the differential back channel data signal 111$b$. The resulting transistor currents 213$p$, 213$n$ produce voltages across cable termination resistors 138p, 138n, thereby producing the differential back channel data signal voltage 135, which is coupled to the cable 130 by the coupling capacitors 140p, 140n. The additional, e.g., internal, coupling capacitors 142p, 142n are substantially smaller in capacitance values, thereby providing the high pass frequency filtering that blocks most of the signal energy produced by the lower frequency back channel data signal 135.

The replica driver circuit 204 also includes opposing transistors 214p, 214n forming another differential amplifier, biased by another tail current source transistor 214a (also biased by the bias voltage Vbias). These transistors 214p, 214n are also driven by the positive 111bp and negative 111bn phases of the differential back channel data signal 111b. The resulting transistor currents 215p, 215n produce voltages across load resistors 216p, 216n, thereby generating a replica differential back channel data signal voltage 215. This replica signal 215 is coupled by additional coupling capacitors 218p, 218n (which also provide DC isolation) to the input terminals of the forward channel receiver 132. The input terminals of the forward channel receiver 132 are biased with a common-mode voltage VCM via common mode pull-up resistors 144p, 144n.

As noted above, the additional coupling capacitors 142p, 142n provide for high pass filtering of the outgoing back channel data signal 135. As a result, signal components related to the outgoing back channel data signal within the filtered differential data signal 143 are reduced in magnitude. These signal components are further reduced by the coupled replica back channel data signal 215, which is inverted relative to the outgoing back channel data signal 135. This results in a subtraction of the inverted replica back channel data signal 215 from any remnant signal components coupled by the additional in-line coupling capacitors 142p, 142n. Such subtraction, or cancellation, of coupled back channel data signal components within the filtered forward channel data signal 143 can be maximized by appropriate scaling of the dimensions of the replica amplifier transistors 214p, 214n relative to the dimensions of the back channel driver amplifier transistors 212p, 212n (e.g., by scaling their respective channel length and width dimensions in accordance with well known techniques). Additionally, current requirements for operation of the replica driver circuitry 204 can be minimized by appropriate scaling up of the replica driver load resistors 216p, 216n relative to the termination/load resistors 138p, 138n of the main back channel driver circuit 202, thereby requiring lower replica signal currents 215p, 215n as compared to the main signal currents 213p, 213n.

Figure 5:
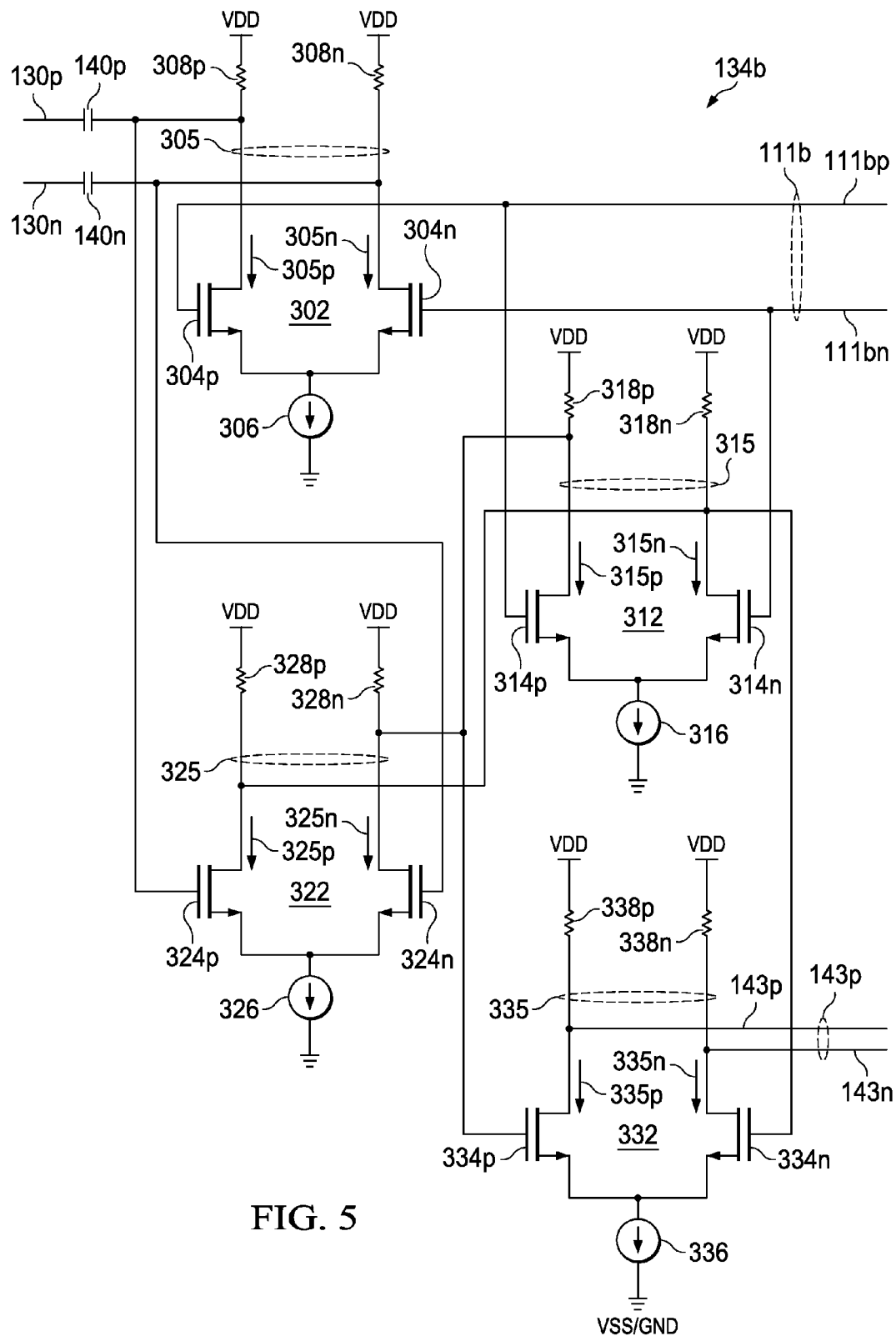
FIG. 5 is a schematic diagram of back channel driver circuitry for data signal transceiver circuitry in accordance with another embodiment of the presently claimed invention.

Referring to FIG. 5, back channel driver circuitry 134b in accordance with another embodiment of the presently claimed invention provides for subtraction, or nullification, of back channel data signal energy within the forward data channel signal to be processed. This is achieved by isolating the back and forward channel data signals electrically as opposed to frequency separation as in the circuit of FIG. 4. This is advantageous for those applications in which the frequency separation between the data rates of the forward and back channels (downstream and upstream data signals, respectively) is not sufficient for effective isolation by filtering as discussed above for the circuitry of FIG. 4 (as well as as cases in which the downstream and upstream data signals have similar or equal data rates). Such circuitry includes the main back channel driver circuitry 302, replica driver circuitry 312, isolation circuitry 322, and combining, or summing, circuitry 332, all interconnected substantially as shown.

The main driver circuitry 302 includes transistors 304p, 304n forming a differential amplifier with a tail current source 306 and termination/load resistors 308p, 308n. The replica driver circuitry 312 also includes a differential amplifier formed by transistors 314p, 314n with by a tail current source 316 and load resistors 318p, 318n. The isolation circuitry 322 also includes a differential amplifier formed by opposing transistors 324p, 324n with a tail current source 326 and load resistors 328p, 328n. Similarly, the combining circuitry 332 includes a differential amplifier formed by transistors 334p, 334n with a tail current source 336 and load resistors 338p, 338n.

The positive 111bp and negative 111bn phases of the back channel data signal 111b drive the gate electrodes of the transistors 304p, 304n of the main driver circuitry 302. This produces transistor currents 305p, 305n, which, in turn, generate voltages across the load resistors 308p, 308n to produce a differential back channel data signal 305 at the output electrodes. The current of this back channel data signal 305 combines with the current of the forward channel data signal coupled from the cable 130 by the coupling capacitors 140p, 140n. The resulting composite signal, composed of forward channel and back channel data signal components, drive the input electrodes of the isolation circuitry 322. This produces output currents 325p, 325n, which, in turn, generate voltages across the load resistors 328p, 328n and produce a differential isolated signal voltage 325 at the output electrodes.

The input electrodes of the replica driver circuitry 312 are also driven by the positive 111 by and negative 111bn phases of the back channel data signal 111b. This results in transistor currents 315p, 315n that generate voltages across the load resistors 318p, 318n and produce a differential signal voltage 315 at the output electrodes. The currents of these isolated 325 and replica 315 signals combine by summing at the summing nodes formed by the mutually connected output electrodes of the isolation circuitry 322 and replica driver circuitry 312. Since the isolated signal 325 is the sum of the forward and back channel data signal components, and the replica back channel data signal 315 is an inverted version of the back channel data signal, the resulting combined signal presented at the gate electrodes of the combining circuitry transistors 334p, 334n includes the forward channel data signal components and substantially zero back channel data signal energy. As a result, the transistor currents 335p, 335n that are produced and generate voltages across the load transistors, 338p, 338n provide a differential output voltage 335 containing substantially only forward channel data signal energy.

Hence, as discussed hereinabove, forward and back channel data signals can be conveyed simultaneously in both directions of a common conductor pair by isolating the forward and back channel data signal components, either electrically or by signal frequency, and subtracting out the undesired back channel data signal components from the forward channel data signal by introducing replica back channel data signal components inverse in phase to the original components. Isolation by signal frequency can be achieved by filtering, e.g., with series coupling capacitances 142p, 142n in circuitry 134a such as that depicted in FIG. 4. Electrical isolation can be achieved by buffering signal voltage and/or signal current, e.g., with isolation circuitry 322 in the form of a buffer amplifier in circuitry 134b such as that depicted in FIG. 5.

Figure 6:
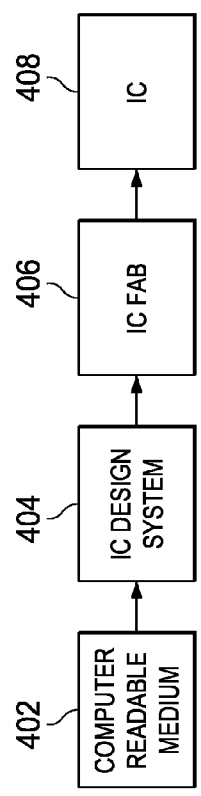
FIG. 6 is a functional block diagram of an exemplary embodiment of an integrated circuit design and fabrication system operated in accordance with computer instructions.

Referring to FIG. 6, integrated circuit (IC) design systems 404 (e.g., work stations or other forms of computers with digital processors) are known that create integrated circuits based on executable instructions stored on a computer readable medium 402, e.g., including memory such as but not limited to CD-ROM, DVD-ROM, other forms of ROM, RAM, hard drives, distributed memory, or any other suitable computer readable medium. The instructions may be represented by any programming language, including without limitation hardware descriptor language (HDL) or other suitable programming languages. The computer readable medium contains the executable instructions (e.g., computer code) that, when executed by the IC design system 404, cause an IC fabrication system 406 to produce an IC 408 that includes the devices or circuitry as set forth herein. Accordingly, the devices or circuits described herein may be produced as ICs 408 by such IC design systems 404 executing such instructions.

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A downstream transceiver circuit for receiving and transmitting respectively forward channel and back channel data signals conveyed simultaneously as a composite data signal via a common conductor pair terminated at a downstream end with respective downstream coupling capacitors, comprising:

downstream transceiver circuitry including a downstream signal path coupled to the downstream end of the conductor pair through the downstream coupling capacitors, including a forward channel receiver configured to receive over the downstream signal path forward channel data signals at a forward channel frequency, and a back channel driver configured to transmit over the downstream signal path back channel data signals at a back channel frequency, wherein the forward channel frequency is substantially greater than the back channel frequency; and the downstream transceiver circuitry further including:

in the downstream signal path, respective filter capacitors coupled between respective downstream coupling capacitors and the forward channel receiver, with the filter capacitors having a capacitance value substantially less than that of the downstream coupling capacitors; and a replica signal driver coupled to the downstream signal path downstream from the filter capacitors between the filter capacitors and an input to the forward channel receiver, and configured to generate back channel replica signals corresponding to an inverse of the back channel data signal;

wherein the back channel driver is coupled to the downstream signal path upstream from the filter capacitors between the filter capacitors and the downstream coupling capacitors;

such that signal components corresponding to the back channel data signals are significantly reduced at the input to the forward channel receiver.

2. The circuit or claim 1, wherein the filter capacitors and the replica signal driver are cooperatively configured to minimize signal components of the back channel data signals at the input to the forward channel receiver.

3. The circuit of claim 1, wherein the back channel driver comprises back channel differential amplifier circuitry, and the replica signal driver comprises replica differential amplifier circuitry.

4. The circuit of claim 3, wherein the replica differential amplifier circuitry includes at least one transistor scaled relative to a corresponding at least one transistor of the back channel differential amplifier circuitry, thereby reducing back channel data signal components at the input to the forward channel receiver.

5. The circuit of claim 3, wherein the replica differential amplifier circuitry includes load resistors scaled relative to corresponding load resistors of the back channel differential amplifier circuitry, thereby reducing replica signal driver currents relative to back channel driver currents.

6. The transceiver communication system of claim 3, wherein the replica differential amplifier circuitry includes load resistors scaled relative to corresponding load resistors of the back channel differential amplifier circuitry, thereby reducing replica signal driver currents relative to back channel driver currents.

7. A transceiver communication system for receiving and transmitting respectively forward channel and back channel data signals conveyed simultaneously as a composite data signal via a common conductor pair terminated at an upstream end and a downstream end by respective upstream and downstream coupling capacitors, comprising:

an upstream transceiver and a downstream transceiver coupled respectively through the upstream and downstream coupling capacitors respectively to the upstream and downstream ends of the conductor pair;

the upstream transceiver circuitry including a forward channel driver and a back channel receiver respectively configured to transmit forward channel data signals and receive back channel data signals conveyed over the conductor pair as the composite data signal;

the downstream transceiver circuitry including a downstream signal path coupled to the downstream end of the conductor pair through the downstream coupling capacitors, including a forward channel receiver configured to receive over the downstream signal path forward channel data signals at a forward channel frequency, and a back channel driver configured to transmit over the downstream signal path back channel data signals at a back channel frequency, wherein the forward channel frequency is substantially greater than the back channel frequency; and the downstream transceiver circuitry further including:

in the downstream signal path, respective filter capacitors coupled between respective downstream coupling capacitors and the forward channel receiver, with the filter capacitors having a capacitance value substantially less than that of the downstream coupling capacitors; and a replica signal driver coupled to the downstream signal path downstream from the filter capacitors between the filter capacitors and an input to the forward channel receiver, and configured to generate back channel replica signals corresponding to an inverse of the back channel data signal;

wherein the back channel driver is coupled to the downstream signal path upstream from the filter capacitors between the filter capacitors and the downstream coupling capacitors;

such that signal components corresponding to the back channel data signals are significantly reduced at the input to the forward channel receiver.

8. The transceiver communication system of claim 7, wherein the filter capacitors and the replica signal driver are cooperatively configured to minimize signal components of the back channel data signals at the input to the forward channel receiver.

9. The transceiver communication system of claim 7, wherein the back channel driver comprises back channel differential amplifier circuitry, and the replica signal driver comprises replica differential amplifier circuitry.

10. The transceiver communication system of claim 9, wherein the replica differential amplifier circuitry includes at least one transistor scaled relative to a corresponding at least one transistor of the back channel differential amplifier circuitry, thereby reducing back channel data signal components at the input to the forward channel receiver.

11. A method of receiving and transmitting respectively forward channel and back channel data signals conveyed simultaneously as a composite data signal via a common conductor pair terminated at a downstream end with respective downstream coupling capacitors, comprising:

configuring a downstream signal path coupled to the downstream end of the conductor pair through the downstream coupling capacitors, and including respective filter capacitors, with the filter capacitors having a capacitance value substantially less than that of the downstream coupling capacitors;

receiving, over the downstream signal path, forward channel data signals at a forward channel frequency, input to a forward channel receiver; and transmitting, over the downstream signal path, back channel data signals at a back channel frequency, generated by a back channel driver;

wherein the forward channel frequency is substantially greater than the back channel frequency;

generating back channel replica signals corresponding to an inverse of the back channel data signals; and coupling the back channel data signals into the downstream signal path upstream from the filter capacitors between the filter capacitors and the downstream coupling capacitors, and coupling the replica data signals into the downstream signal path downstream from the filter capacitors between the filter capacitors and an input to the forward channel receiver;

such that signal components corresponding to the back channel data signals are significantly reduced at the input to the forward channel receiver.

12. The method or claim 11, wherein the back channel replica signals are generated by a replica signal driver, and wherein the filter capacitors and the replica signal driver are cooperatively configured to minimize signal components of the back channel data signals at the input to the forward channel receiver.

13. The method of claim 11, wherein the back channel driver comprises back channel differential amplifier circuitry, and wherein the back channel replica signals are generated by replica differential amplifier circuitry.

14. The method of claim 13, wherein the replica differential amplifier circuitry includes at least one transistor scaled relative to a corresponding at least one transistor of the back channel differential amplifier circuitry, thereby reducing back channel data signal components at the input to the forward channel receiver.

15. The method of claim 13, wherein the replica differential amplifier circuitry includes load resistors scaled relative to corresponding load resistors of the back channel differential amplifier circuitry, thereby reducing replica signal driver currents relative to back channel driver currents.

* * * * *